May 2, 1933.  C. R. MASON  1,906,914
LIQUID TREATING APPARATUS
Original Filed April 13, 1929   3 Sheets-Sheet 1
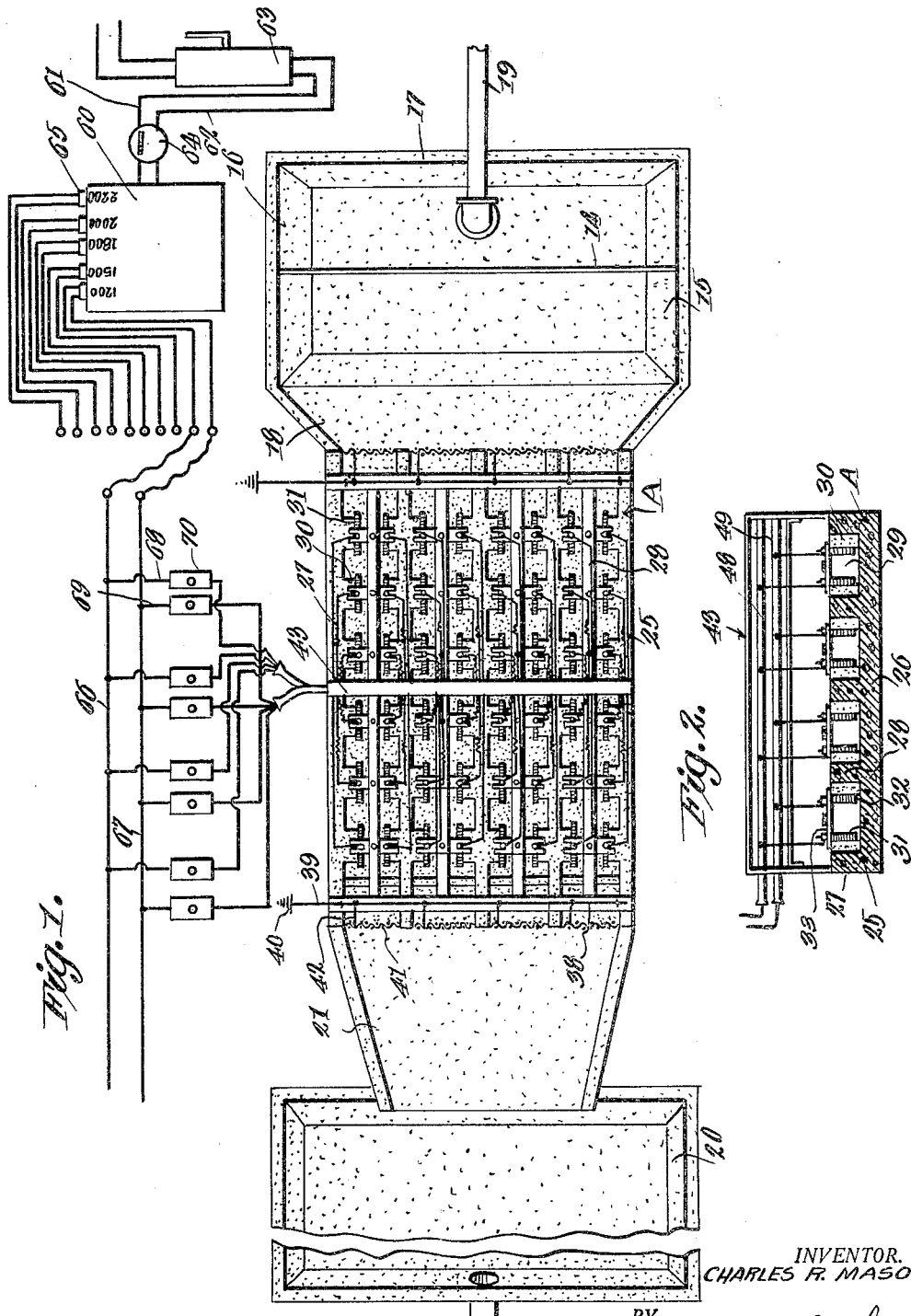
INVENTOR.
CHARLES R. MASON
BY
Irving L. McCathran
ATTORNEYS.

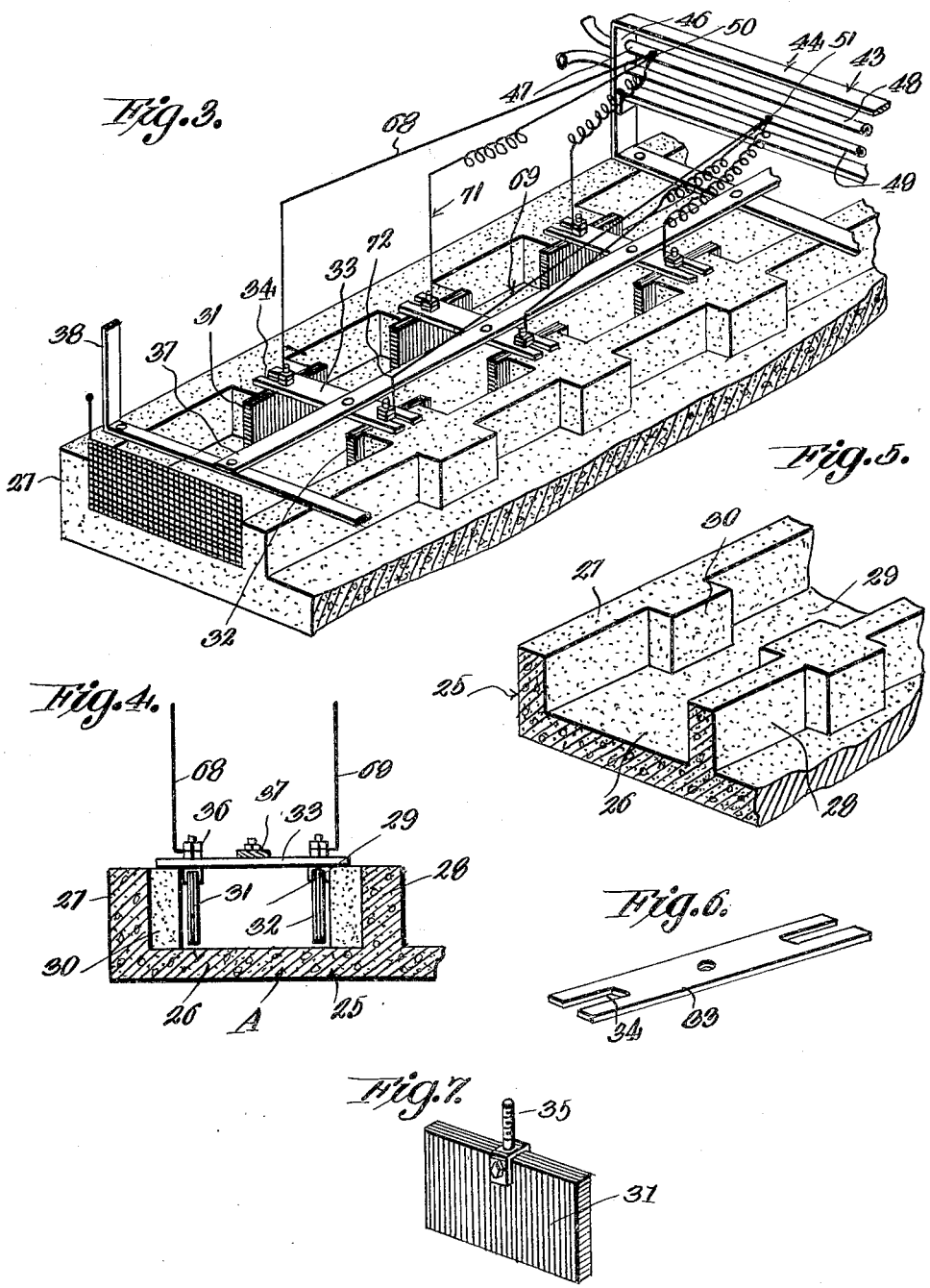

May 2, 1933.                    C. R. MASON                    1,906,914
                         LIQUID TREATING APPARATUS
              Original Filed April 13, 1929          3 Sheets-Sheet 3
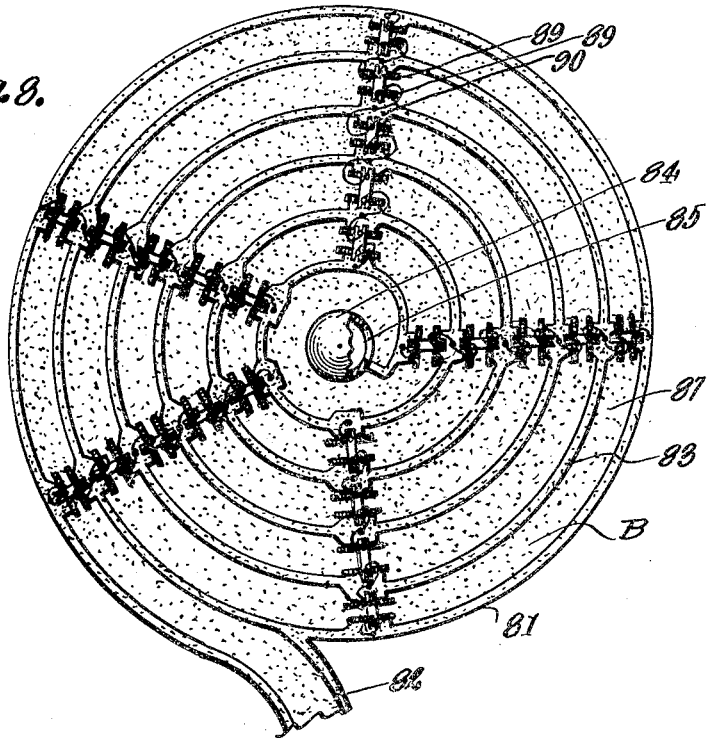
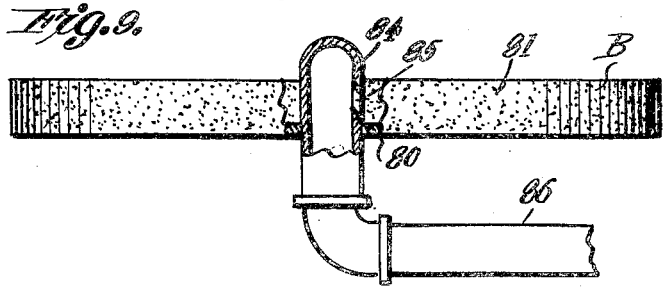
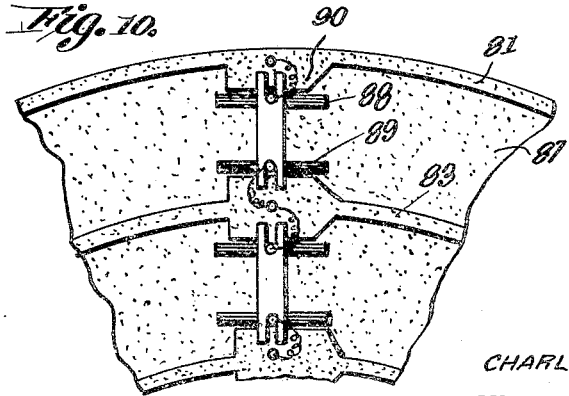
INVENTOR.
CHARLES R. MASON
BY
*Irving L. McCathran*
ATTORNEYS.

Patented May 2, 1933

1,906,914

UNITED STATES PATENT OFFICE

CHARLES R. MASON, OF YOUNGSTOWN, OHIO, ASSIGNOR OF TWO-FIFTHS TO JOHN J. SCHAEFFER, OF YOUNGSTOWN, OHIO

LIQUID TREATING APPARATUS

Refiled for abandoned application Serial No. 354,821, filed April 13, 1929. This application filed May 11, 1932. Serial No. 610,697.

This invention appertains to a water purifying device which is capable of being used on a large scale such as for city water plants.

One of the primary objects of my invention is the provision of means for purifying water and other liquid by an electrolytic process, my apparatus being so constructed as to kill all bacteria in the liquid by electricity.

Another important object of my invention is the provision of means for leading the water to be purified over a suitable table divided into suitable weirs or channelways so that the water can be effectively treated during its flow through the channelways by my novel electrolytic process.

A further object of my invention is the provision of a receiving tank for the water to be purified having an outlet apron for leading the water over the table and into the channelways or weirs, each of the channelways having a plurality of pairs of spaced electrodes arranged therein of different polarity with novel means for connecting the electrodes with the feed and return wires of a source of electrical energy of high voltage.

A further important object of my invention is the provision of means for stepping up the voltage to the electrodes by the use of a variable voltage or induction transformer whereby the device can be effectively used with an ordinary source of electric light supply.

A further object of my invention is the provision of means for agitating the water incident to the flow of the same through the channelways thereby insuring of the proper electrolytic action taking place through the water as the same passes the electrodes of different polarity.

A further object of my invention is the provision of a novel safety device used in connection with the table including a plurality of copper screens arranged in the channelways and grounded whereby in case a fuse should be blown in one of the wires, say the feed wire, the screens will ground the water and thus take off the current therefrom and prevent the transmission of electric shock from the water.

A further object of my invention is the provision of a settling tank for receiving the purified water from the table, the settling tank being adapted to receive sand or other suitable material for clarifying the water prior to the delivery thereof to the city mains.

A still further object of my invention is to provide novel means for purifying water of the above character, which will be durable and efficient in use, one that will be simple and easy to install and one which can be incorporated with a water system at a small cost.

With these and other objects in view, the invention consists in the novel construction, arrangement and formation of parts, as will be hereinafter more specifically described, claimed, and illustrated in the accompanying drawings.

The present application is filed in place of my abandoned application Serial Number 354,821, filed April 13, 1929.

In the drawings:—

Figure 1 is a top plan view of my improved water purifying device, the wiring system therefor being shown diagrammatically;

Figure 2 is a transverse section through the water purifying table illustrating the means for leading the wires to the electrodes;

Figure 3 is an enlarged fragmentary perspective view of the table showing the formation of the water channelways or weirs therein and the arrangement of the electrodes in said channelways;

Figure 4 is an enlarged fragmentary transverse section through one of the channelways showing the water abutments therein and the electrodes arranged adjacent to said abutments;

Figure 5 is an enlarged fragmentary perspective view through a portion of the table showing the arrangement of the water abutments in the channelways;

Figure 6 is a detail perspective view of one of the holding straps for the electrodes;

Figure 7 is a detail perspective view of one of the electrodes;

Figure 8 is a top plan view of a slightly modified form of my invention in which I utilize a spiral channelway instead of a plurality of longitudinally extending channelways;

Figure 9 is a side elevation of the modified form of my device showing parts thereof broken away and in section, and Figure 10 is an enlarged fragmentary top plan view of the table showing the means for mounting the electrodes in the spiral channelways.

Referring to the drawings in detail, wherein similar reference characters designate corresponding parts throughout the several views, the letter A generally indicates my improved water purifying device which comprises a water receiving tank 15 and a spaced water settling tank 20 with a table 25 connecting the tanks together, which table forms an essential part of the invention.

The water receiving tank 15 can be constructed from concrete if desired and includes end walls 16 and side walls 17, the inner side wall being provided with an apron 18 for leading the water onto the table 25 as the same overflows from the tank 15. A suitable supply pipe 19 leads into the tank 15 adjacent to the outer side wall and this pipe can lead from any suitable source of water supply. Arranged across the tank 15 and in front of the supply pipe 19, I prefer to arrange a screen 14 for holding back solid matter in the water and preventing such solid matter from being delivered with the water onto the table 25.

The tank 20 can also be formed of concrete if preferred and is somewhat of the same configuration of the receiving tank 15 and has communicating therewith the outlet distributing apron 21 leading from the table 25 so that the water, as the same flows from the table, will be received into said settling tank. This tank can be filled with granular material such as sand or the like so as to clarify the water prior to the delivery thereof to the outlet pipe 22, which can lead to the water mains.

Referring to the table 25, which as stated, forms one of the salient features of my invention, the same can also be constructed from concrete or the like and includes a lower flat wall 26, which can if preferred be slightly inclined toward the outlet apron 21. The table 25 has formed on its longitudinal side edges side walls 27 and is further provided with equi-distantly spaced longitudinally extending partition walls 28 forming a plurality of longitudinally extending channelways or weirs 29. Each channelway at equi-distantly spaced points is provided with inwardly extending abutments 30 which can be formed integral with the side walls 27 and the partition walls 28. These abutments 30 form means for agitating the water incident to the passage of the water past the same and thus these abutments 30 are in the nature of baffles to hinder the passage of the water down the channelways or weirs.

In each channelway I arrange a plurality of pairs of electrodes 31 and 32 which are preferably constructed from carbon and the electrode 31 of each pair can be considered as the positive member, while the electrode 32 of each pair can be considered as the negative member. The electrodes 31 and 32 are held in proper spaced position in the channelways by means of straps 33 which are formed from electric insulating material and I prefer to construct these straps from ebony board and the terminals of the straps are provided with slots 34 for the reception of the terminal posts 35 formed on or secured to the electrodes. These posts 35 receive binding nuts 36 by means of which the wires can be connected thereto and whereby the electrodes can be clamped to the holding straps. The straps are held in proper spaced relation relative to one another by a longitudinally extending strap 37 which is also formed from insulating material and if desired can also be constructed from ebony. The longitudinal straps 37 of each channelway can have bolted thereto transversely extending end frames 38 formed of insulating material and these frames are preferably anchored to the side walls 27 so as to be rigidly connected therewith. The opposite end frames 38 may carry a wire 39 extending longitudinally thereof, which wire is grounded as at 40, for a purpose which will be hereinafter described.

Each channelway 29 at the opposite ends thereof is provided with a copper screen 41 which screen not only functions to remove solid matter from the water, but also functions as means for grounding the water and each screen has connected thereto a branch wire 42 which can be connected to the wire 39 as heretofore described.

I also provide a transversely extending supporting frame 43 which frame is also formed of insulating material and is arranged equi-distantly from the end frames 38. The frame 43 may include top and bottom bars 44 and 45 and connecting upright end bars 46 provided with guide openings 47. This frame 43 is also connected to the longitudinally extending straps 37 and forms a further means for connecting these straps together and for bracing the same against shifting movement. The guide openings 47 formed in the frame 43 can removably receive upper and lower distributing tubes 48 and 49 which extend out from one end of the frame and receive the wires for the electrodes 31 and 32. The upper tube 48 is provided with a plurality of outlet openings 50 for the positive wires and it can be seen that an opening 50 is arranged adjacent to each channelway. The lower tube 49 is provided with a plurality of outlet openings 51 for the negative wires and it can be seen that an opening 51 is provided for each of the channelways.

Referring to the wiring, the current from any suitable source of energy is led into a variable voltage or induction transformer 60 by line wires 61 and 62 which may have incorporated therein a control switch 63 and a meter 64. The variable voltage transformer can be provided with a plurality of outlet taps 65 of different voltages and I arrange adjacent to the table but spaced therefrom the parallel feed and return wires 66 and 67 which can be connected with any pair of the taps 65 of the desirable voltage. It is to be noted that the voltage from the ordinary line is stepped up a relatively great amount in order that a current of high voltage will be delivered to the electrodes.

Leading from the wires 66 and 67 is a plurality of pairs of branch wires 68 and 69 and the wire 69 of each pair of wires is connected to the negative wire 67, while the branch wire 68 of each pair of wires is connected to the positive wire 67. A separate control switch 70 is arranged or interposed in the length of each branch wire 68 and 69 and these wires are then led into their respective tubes 48 and 49, as shown, the positive wires being led into the tube 48 and the negative wires being led into the tube 49. The first pair of branch wires is provided for the first channelway, the second pair of branch wires for the second channelway, and so on, and thus means is independently provided for controlling the flow of current to the electrodes for each channelway. The wire 68 for the first channelway is provided with a plurality of branches 71 so that the same can be connected to all of the positive electrodes and these wires 71 are all of the same length and the electrodes nearest the supporting frame 43 have the wires thereof coiled to take up the excess length and by providing the wires all of the same length, the same voltage will be delivered to all of the electrodes. The negative wire 69 for the first channelway is provided with a plurality of branches 72 which are connected with the negative electrodes and these branch wires 72 are also all of the same length, and the wires of the electrodes nearest the frame are coiled to take up the said excess length. The other wires leading through the two tubes are led out through their openings 50 and 51 in the tubes 48 and 49 and are likewise connected to their respective electrodes in the different channelways.

By this arrangement of parts, the water will be initially delivered into the receiving tank from which the same will overflow down the apron 18 into the various channelways, which divide the water into relatively narrow streams, thus permitting the electrodes to effectively act upon the water and set up the necessary electrolytic action therein. The flow of current back and forth between the positive and negative electrodes will effectively kill all bacteria in the water, thus effectively purifying the same. As the water leaves the table, the same flows down the apron 21 into the settling tank 20 where the same is clarified by the sand or other granular material and the water is then finally delivered to the water mains through the pipe 22. As stated, the copper screens 41 form means for grounding the water and thus acting as a safety device should a fuse be blown in any of the electrodes.

While the arrangement of the table shown in Figures 1 to 5 inclusive may be considered as the preferred form of my invention, it is to be understood that my table can be modified within certain limits and in Figures 8 to 10 inclusive, I have shown one modified form of my table. The table in Figures 8, 9, and 10, is generally indicated by the reference character B and can be also made of concrete if so desired. The table is of a substantially circular form and includes a disk-shaped flat bottom wall 80 having an upstanding substantially annular marginal side wall 81 which is provided with a tangentially extending outlet way or pipe 82 for conveying the water to the city main or to a settling tank. The table has formed thereon a spiral partition wall 83, the inner end of which can be connected to the inlet nozzle 84 having an outlet opening 85 communicating with the innermost convolutions of said partition wall and the nozzle 84 has communicating therewith a supply pipe 86 for leading the unpurified water into said nozzle. The arrangement of the spiral partition wall 83 in conjunction with the outer wall 81 forms a tortuous or spiral channelway 87 for the water. This channelway 87 has arranged in each convolution thereof a plurality of pairs of spaced electrodes 88 and 89 which electrodes have connected thereto the feed and return wires, which wires can be arranged similar to the preferred form of my invention. It is to be also noted that I arrange abutments 90 in the tortuous water channelway so as to cause the eddying or agitating of the water as the same flows around the channelway. Changes in details may be made without departing from the spirit or the scope of my invention so long as these changes fall within the appended claims.

What I claim as new is:—

1. In an apparatus for purifying liquid, a table over which the liquid flows, a plurality of longitudinally extending partitions on the table defining a plurality of relatively narrow liquid channelways, inwardly extending baffle blocks carried by the partitions, and a plurality of spaced pairs of electrodes in said channelways arranged in facial abutment with said baffle blocks.

2. In an apparatus for purifying liquid, a table having a channelway, a plurality of baffle blocks in said channelway, and a plurality of spaced pairs of electrodes in said channelway arranged in facial abutment with said baffle blocks.

3. In an apparatus for purifying liquid, an elongated table over which the water flows, a plurality of longitudinally extending partitions on the table defining a plurality of relative narrow liquid channelways, a plurality of pairs of electrodes arranged in spaced relation in each of said channelways, a frame extending transversely of said table and secured thereto, positive and negative manifold tubes carried by said frame, each of said tubes being provided with openings on each side thereof above said channelways, said frame being arranged substantially equidistantly the ends of the table, and positive and negative wires extending into their respective manifold tubes and led out of the openings and electrically connected with the electrodes.

4. In an apparatus for purifying liquid, a circular table having a relatively narrow spiral liquid receiving channel, the table being provided with an axially disposed liquid inlet and a peripheral water outlet, spaced pairs of baffle blocks arranged in the channelway throughout the length thereof, spaced pairs of electrodes arranged in the channelway in facial abutment with said abutment blocks, and straps of insulating material extending across the various convolutions of the liquid receiving channel at spaced points connecting the electrodes of each pair together.

In testimony whereof I affix my signature.

CHARLES R. MASON.